United States Patent
Novo Diaz et al.

(10) Patent No.: US 10,356,138 B2
(45) Date of Patent: Jul. 16, 2019

(54) METHOD AND NODES FOR CONFIGURING A COMMUNICATION PATH FOR A MEDIA SERVICE

(71) Applicant: Telefonaktiebolaget LM Ericsson (publ), Stockholm (SE)

(72) Inventors: Oscar Novo Diaz, Helsinki (FI); Jouni Mäenpää, Nummela (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 91 days.

(21) Appl. No.: 15/110,663

(22) PCT Filed: Jan. 13, 2014

(86) PCT No.: PCT/SE2014/050024
§ 371 (c)(1),
(2) Date: Jul. 8, 2016

(87) PCT Pub. No.: WO2015/105443
PCT Pub. Date: Jul. 16, 2015

(65) Prior Publication Data
US 2016/0381093 A1     Dec. 29, 2016

(51) Int. Cl.
*H04L 29/06*     (2006.01)
*H04L 29/08*     (2006.01)
(Continued)

(52) U.S. Cl.
CPC ............ *H04L 65/403* (2013.01); *H04L 41/12* (2013.01); *H04L 41/5041* (2013.01); *H04L 43/16* (2013.01); *H04L 47/17* (2013.01); *H04L 65/1069* (2013.01); *H04L 65/1093* (2013.01); *H04L 65/4076* (2013.01);
(Continued)

(58) Field of Classification Search
None
See application file for complete search history.

(56) References Cited

U.S. PATENT DOCUMENTS

| | | |
|---|---|---|
| 2004/0057409 A1 | 3/2004 | Kennedy |
| 2007/0124449 A1* | 5/2007 | Kang ..................... H04L 41/06 709/223 |

(Continued)

FOREIGN PATENT DOCUMENTS

EP     2 592 550 A1     5/2013

OTHER PUBLICATIONS

International Search Report, Application No. PCT/SE2014/050024, dated Oct. 13, 2014.
(Continued)

*Primary Examiner* — Anh Ngoc M Nguyen
(74) *Attorney, Agent, or Firm* — Sage Patent Group (57) ABSTRACT

A network node is operated to configure a communication path for a media service. The communication path is configured in a cloud network that includes at least one media processing unit that handles media processing required by the media service. The node is located along the communication path and discovers at least one media processing unit by obtaining location information for the at least one media processing unit and configuring the communication path between end user communication devices of the media service by interconnecting.

19 Claims, 4 Drawing Sheets

(51) Int. Cl.
*H04L 12/24* (2006.01)
*H04L 12/26* (2006.01)
*H04L 12/801* (2013.01)

(52) U.S. Cl.
CPC .............. *H04L 67/16* (2013.01); *H04L 67/18* (2013.01); *H04L 41/509* (2013.01)

(56) References Cited

U.S. PATENT DOCUMENTS

| | | | |
|---|---|---|---|
| 2013/0024503 A1 | 1/2013 | Neerdaels | |
| 2013/0148573 A1* | 6/2013 | Boland | H04W 8/005 370/328 |
| 2014/0201379 A1* | 7/2014 | Barzily | H04L 67/101 709/228 |
| 2014/0229105 A1* | 8/2014 | Lee | G01C 21/3407 701/533 |
| 2014/0340220 A1* | 11/2014 | Meraz | G08B 26/008 340/539.13 |
| 2015/0067176 A1* | 3/2015 | Dubois | H04L 69/08 709/227 |
| 2015/0131639 A1* | 5/2015 | Hirose | H04W 48/04 370/338 |

OTHER PUBLICATIONS

Written Opinion of the International Searching Authority, Application No. PCT/SE2014/050024, dated Oct. 13, 2014.

\* cited by examiner

METHOD AND NODES FOR CONFIGURING A COMMUNICATION PATH FOR A MEDIA SERVICE

CROSS REFERENCE TO RELATED APPLICATION

This application is a 35 U.S.C. § 371 national stage application of PCT International Application No. PCT/SE2014/050024, filed on Jan. 13, 2014, the disclosure and content of which is incorporated by reference herein in its entirety. The above-referenced PCT International Application was published in the English language as International Publication No. WO 2015/105443 A1 on Jul. 16, 2015.

TECHNICAL FIELD

The technology disclosed herein relates generally to the field of cloud based communication systems, and in particular to architectures for and configuring of communication paths within such cloud based communication systems.

BACKGROUND

A traditional model for delivering rear-time communication services to e.g. enterprises has been to install dedicated communication hardware and software within the enterprise premises. In this model, the enterprise purchases the communication infrastructure and deploys it within its own premises. The enterprise also takes care of the maintenance of its on-premises communication infrastructure.

Today, an increasing number of cloud-based providers offer their services to enterprise customers. The cloud providers are offering their equipment, in particular virtualized communication servers in their data centers, and also take care of maintaining the servers and cloud network on behalf of the enterprise customers.

There is a need for cloud-based hosted communication services since far from all enterprises can afford or want to invest time and resources in building their own on-premises communication solution. Instead, these enterprises want to outsource the complexity of maintaining the infrastructure required by the communication solution to a third party provider, that is, to the cloud service provider. A challenge that the cloud service provider faces is the running of a complex communication service and its components in its own cloud network for multiple enterprise customers in parallel.

The architectures of present-day real-time communication systems are highly complex. Typically, these solutions use a layered architecture dividing nodes involved in the communication system into media plane nodes and control plane nodes. The number of control plane nodes in particular can be very high. As an example, in the Third Generation Partnership Project (3GPP) IP (Internet Protocol) Multimedia Subsystem (IMS) architecture, there are several control plane nodes, including among others Call Session Control Functions (CSCF): Proxy CSCF (P-CSCF), Interrogating CSCF (I-CSCF), and Serving CSCF (S-CSCF); Media Resource Function Controllers (MRFCs), SIP (Session Initiation Protocol) Application Servers (ASs), and Session Border Controllers (SBCs). The MS architecture is perhaps the most extreme example, but in general, architectures of standardized communication systems are fairly complex.

For a cloud service provider that needs to host the full set of nodes required to deliver communication services in its cloud infrastructure for multiple enterprise customers in parallel, the situation is highly challenging. The resulting complexity, i.e. the need to run multiple virtualized control and media plane nodes in the datacenters and to manage the interconnections between these components, makes it more expensive to provide the communication service and also makes maintenance of the communication system more difficult. Thus, it is clear that cloud service providers would benefit from more simple and thus more cloud-friendly real-time communication system architectures.

In addition to cloud service providers, also enterprises running virtualized communication solutions in their private clouds could benefit from simpler communication service architectures.

SUMMARY

An object of the present disclosure is to solve or at least alleviate one of the above mentioned problems.

The object is according to a first aspect achieved by a method performed in a node for configuring a communication path for a media service. The communication path is configured in a cloud network comprising at least one media processing unit configured to handle media processing required by the media service, and the node is located along the communication path. The method comprises: discovering at least one media processing unit by obtaining location information for the at least one media processing unit; and configuring the communication path between end user communication devices of the media service by interconnecting one or more of the discovered media processing units.

The method provides a self-organizing media plane architecture wherein centralized controller nodes, e.g. control plane modules such as the MRFC and AS virtual machines, are removed and a simplified architecture for cloud-based real-time communication services is enabled. Instead of various centralized controller nodes setting up a communication path between end users by using control signaling, a node that is located along the communication path itself discovers one or more media processing units and configures the communication path. The node may be a media processing unit processing media streams for the media service or an end user communication device.

The object is according to a second aspect achieved by a node for configuring a communication path for a media service. The communication path is configured in a cloud network comprising at least one media processing unit configured to handle media processing required by the media service. The node is located along the communication path. The node comprises a processor and memory, the memory containing instructions executable by the processor, whereby the node is operative to: discover at least one media processing unit by obtaining location information for the at least one media processing unit; and configure the communication path between end user communication devices of the media service by interconnecting one or more of the discovered media processing units.

The object is according to a third aspect achieved by a computer program for anode for configuring a communication path for a media service. The communication path configured in a cloud network comprising at least one media processing unit configured to handle media processing required by the media service. The node is being located along the communication path. The computer program comprises computer program code, which, when run on the node causes the node to: discover at least one media processing unit by obtaining location information for the at least one media processing unit; and configure the communication path between end user communication devices of the media service by interconnecting one or more of the discovered media processing units.

The object is according to a fourth aspect achieved by a computer program product comprising a computer program as above, and a computer readable means on which the computer program is stored.

The object is according to a fifth aspect achieved by a node comprising means for discovering at least one media processing unit by obtaining location information for the at least one media processing unit, and means for configuring the communication path between end user communication devices of the media service by interconnecting one or more of the discovered media processing units.

Further features and advantages of the present disclosure will become clear upon reading the following description and the accompanying drawings.

DETAILED DESCRIPTION

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

As described in the background section, a cloud-based real-time communication system needs some specific control and media plane nodes to perform media related control and manipulation functions. In the IMS architecture, the latter, i.e. media manipulation functions, are provided by a system called the Media Resource Function (MRF). In the following, a media related module is referred to as a Media Resource Function (MRF).

Basically, each MRF is divided into a Media Resource Function Controller (MRFC) and a Media Resource Function Processor (MRFP). The MRFC is a control plane node that interprets information coming from an Application Server (AS), the information being used for controlling the MRFP. The MRFP is a media plane node used for media functions, such as for example video and audio transcoding, video and audio mixing and switching, and media transport adaptation.

Figure 1:
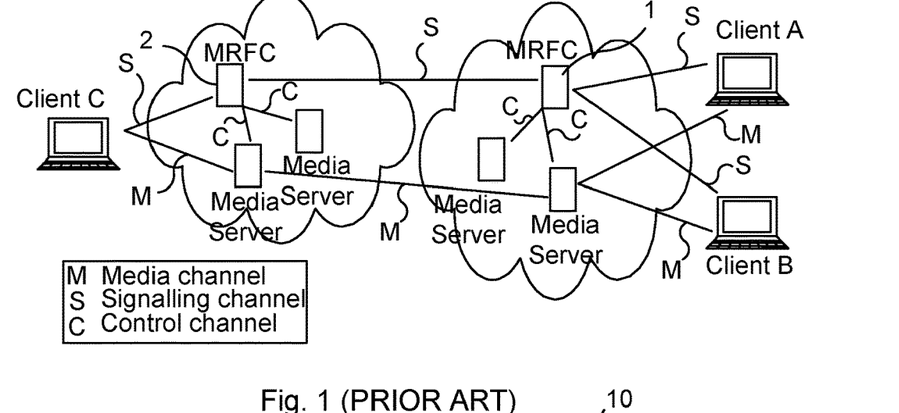
FIG. 1 illustrates a prior art real-time cloud network.

FIG. 1 illustrates a prior art solution on how the MRF (comprising MRFC and MRFP) and the signaling channels and media channels may be defined in a cloud-based real-time communication system. In the FIG. 1, clients A, B and C are contacting a MRFC, which is running on a virtual machine within a virtualized server in a data center, before joining a media session. Clients A and B are contacting a first MRFC in a first data center 1 and the client C is contacting a second MRFC in a second data center 2. This is illustrated in the FIG. 1 by lines indicated by S (for signaling channel). The MRFC instructs the MRFP (also running on a virtual machine and denoted Media Server in the FIG. 1) to create a new session between the three clients. This instructing is illustrated in the FIG. 1 by lines indicated by C (control channel), and the created communication paths between the MRFPs for the session is illustrated by lines indicated by M (media channel). It is noted that FIG. 1 is highly simplified, and that a real-life cloud-based communication system might need to use a very high number of virtual machines for MRFC, MRFP, AS, and further control plane nodes to serve participants of for instance a massive scale geographically distributed multimedia conference session.

Briefly, the present disclosure provides a self-organizing media plane architecture wherein control plane modules such as the MRFC and AS virtual machines are unnecessary and may be omitted. This greatly simplifies the architecture of cloud-based real-time communication services. The disclosure also provides different means to control the MRFPs (i.e. virtualized media servers) without using any MRFC (i.e. control plane) modules.

Thus, the present disclosure provides a simplified architecture of cloud-based real-time communication systems by removing the control plane modules such as MRFCs from the architecture. In the absence of MRFC nodes, a cloud-based communication system has to have other means to control and utilize the media server virtual machines (i.e. MRFPs) of the communication system. Various ways of accomplishing this will be described next.

In particular, four different methods to discover MRFPs (also denoted media servers) in the cloud network without using any MRFC nodes (also denoted media controllers) will be described. A first way is to store the MRFP (i.e. media server virtual machine) locations and capabilities in a (possibly decentralized) database system. A second way is to use multicast-based MRFP discovery. A third way is to use point-to-point cloud communication. A fourth way is to use a combination of the previous ways. In the following, each of these ways to discover MRFPs without an MRFC will be described more in detail.

A note on vocabulary may be in order: a MRFP virtual machine instance is also denoted simply MRFP or a media server or media server instance, and each media server instance is running in one Virtual Machine (VM) within a data center.

A first embodiment for discovering media servers comprise storing information about MRFPs in a database system. The database system may be a single database or a distributed database system. A new component is provided in the cloud network which is denoted Database Media Server (DMS) in the following. A Database Media Server may be implemented as a server instance running in a virtual machine within a datacenter. The DMS may also comprise distributed server instances running in virtual machines in different datacenters or in a single datacenter. The DMS stores information relating to an address, e.g. IP address or domain name system (DNS) name, of every MRFP virtual machine instance in the cloud network. The DMS may also store some extended information about every MRFP. In other words, the DMS acts as a tracker, keeping track of MRFPs, their addresses and capabilities.

Users wishing to establish or join a media session can query the DMS in order to obtain information about (i.e. address of) MRFPs in the cloud network. In addition to the address of every MRFP, the information maintained by the DMS may contain details such as for example the degree of security of the datacenter (e.g. a server) in which it exists, the geographical location of the datacenter (expressed for instance as geographical coordinates), the number and types of codecs supported by the MRFP, the types of media processing operations the MRFP supports, and/or the maximum capacity and current load of the MRFPs.

A DMS may have sensitive information about the topology of the cloud network, and therefore, in an embodiment, the users of the cloud network are requested to perform some authentication mechanism to restrict unauthorized users' access to that information. Depending on the level of authorization of a user, the DMS will provide the user with the full topology information of the cloud network, partial information, or no information at all. As an example, in certain scenarios the operator of the distributed cloud network where the MRFPs are running may not be willing to expose the information about all MRFPs to the users. To prevent this, the operator may introduce filtering logic in the DMS. This logic allows the DMS to return information only about a subset of the MRFPs to the user. As an example, the DMS may return information only about MRFPs that are located geographically close to the user. This may be implemented by determining the rough geographical location of the user based on the source IP address of the query or information provided by the user in the query. As another example, the DMS may return only one MRFP in every datacenter (instead of returning the full list of MRFPs). Finally, if the user has specified requirements for the MRFPs, e.g. requirements on supported codecs, required media processing operations, latency, bandwidth, location, CPU power, etc., in her query sent to the DMS, the DMS may only return information about those MRFPs that fulfill the requirements.

The authentication process and the maintenance of the information in the DMS may be implemented using Lightweight Directory Access Protocol (LDAP). LDAP provides a secure way of accessing and maintaining the information in the DMS.

When an MRFP joins or leaves a network, the MRFP should inform the DMS. Thereby, the DMS may update the topology information it maintains about the cloud network accordingly.

Figure 2:
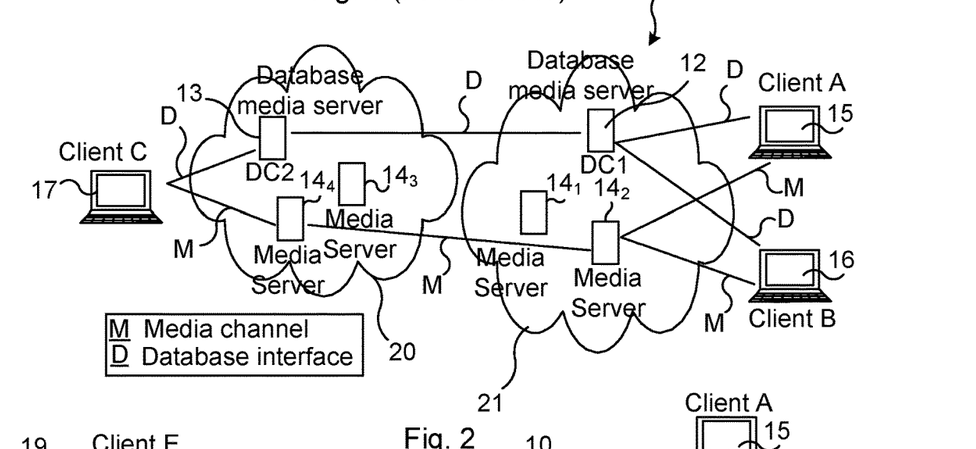
FIG. 2 illustrates schematically an environment in which embodiments of the present disclosure may be implemented.

FIG. 2 illustrates an exemplary cloud communication system 10 using Database Media Servers. As illustrated in the FIG. 2, clients A, B and C (indicated in FIG. 2 also by reference numerals 15, 16 and 17, respectively) may obtain information about the available MRFPs in the cloud network 20, 21 (illustrated as two separate clouds) through the DIMS 12, 13, located in a respective datacenter (denoted DC in the FIG. 2). As was described earlier, the DMS 12, 13 comprises a list of the locations of the MRFPs $14_1$, $14_2$, $14_3$, $14_4$ within the cloud network 20, 21. The DMS 12, 13 may also maintain a metadata file with extended information about every MRFP $14_1$, $14_2$, $14_3$, $14_4$. Such extended information may comprise various types of metadata, defining e.g. encoders or format to store video and audio. An example of such metadata file (in XLM) is:

```
<?xml version="1.0"?>
<mediaMediaServers>
    <mediaServer1>
        <name>Server 1 </name>
        <ip>123.123.123.123</ip>
        <codecs>
            <control>VP8 </control>
            <control>MP4</control>
        </codecs>
    </mediaServer1>
    <mediaServer2>
        <name>Server 2 </name>
        <ip>123.123.123.124</ip>
        <codecs>
            <control>VP8</control>
        </codecs>
    </mediaServer2>
</mediaServers>
```

It is noted that although FIG. 2 illustrates the DMSs as centralized virtual servers in the cloud network 20, 21 (in a respective datacenter in the respective cloud), the DMS may also be implemented as a distributed database among the MRFPs $14_1$, $14_2$, $14_3$, $14_4$ (in the respective cloud network 20, 21). Such distributed DMS may be implemented for instance using a Distributed Hash Table (DHT) based overlay network. The DHT overlay network can be maintained for instance using the REsource LOcation And Discovery (RELOAD) Peer-to-Peer (P2P) signaling protocol. When a distributed DMS is used, users may access the distributed database using the secure RELOAD protocol. A benefit of using a distributed database is that the provider of the cloud communication service does not need to maintain centralized database servers, alleviating the need to purchase and maintain such centralized database servers thus lowering costs. In such distributed database, the information would then be distributed among different media servers.

A second embodiment for discovering media servers comprises Multicast-based MRFP Discovery. In particular, architecture is provided wherein the MRFPs exchange information about their locations through multicast channels. The users of the cloud-based communication system 10 may subscribe to this channel in order to receive the packets that MRFPs send to that group of subscribers. Also the MRFPs themselves may be seen as members of the group.

The multicast channel may be configured to only transmit the information to the users who subscribe to the multicast group. In addition, since native network-level multicast (also denoted IP multicast) is used, the information may be sent using the most efficient strategy and messages are delivered over each link of the network only once. In particular, native multicast implements multicast service at the IP routing level, with each individual packet transmitted from the source, duplicated at routers, and then delivered to multiple receivers simultaneously. It is noted that the particular strategy may be specific for each cloud provider to minimize the amount of resources used in the cloud communication system by the multi cast channels. In other words, every provider may have its own resource allocation schemes depending the number of services and resources in the cloud communication system. By using multicast, in contrast to broadcast (wherein all users receive messages), it is ensured that the cloud network 20, 21 is not flooded with messages carrying media server information.

Once a user joins the multicast group, her device will start receiving information in a multicasting fashion about the different MRFPs in the cloud network 20, 21. Every MRFP will send a packet to the channel informing about its existence. Such packet sending may be performed periodically. Every MRFP will thus send its information in a certain amount of time, for instance, every 5 minutes. Such implementation avoids collapsing the cloud network with to many messages at the same time.

After that, the user can contact the MRFPs whose capabilities and/or locations meet the requirements of the user in order to join or establish a multimedia session. The user may contact the selected MRFPs directly to obtain more information about them.

It is noted that the mechanism described above requires native IP-level multicast support from the cloud network. That is, in order for the user to be able to receive information delivered in a multicast fashion, the cloud network needs to support native multicast. However, many cloud networks today do not yet have such support. In the absence of native IP-level multicast, an Application-Level Multicast (ALM) overlay network may be constructed among the MRFPs and the end users of the cloud communication system 10. The ALM overlay network can then be used in a manner similar to a native IP-level multicast network.

It is further noted that if the user's communication device remains a part of the multicast group for a longer period of time, the communication device may receive potentially a high amount of messages if the distributed cloud communication system 10 contains a high number of MRFPs. In particular, each MRFP sends a packet about itself and messages are transmitted as MRFPs are added. The high amount of incoming traffic may also drain the battery of the device if the device is battery-powered. However, in practice this is in most cases not a problem since the user is typically apart of the multicast group only for a short period of time; the user can choose to leave the multi cast group as soon as she has obtained enough information from it.

Since the multicast-based discovery mechanism reveals a high amount of information about the cloud network 20, 21 to the user, it is very suitable for trusted environments such as enterprise networks. Further, it is noted that this mechanism may not be appropriate for very large cloud networks since this would imply a high frequency of MRFP information being sent to the multicast group.

Figure 3:
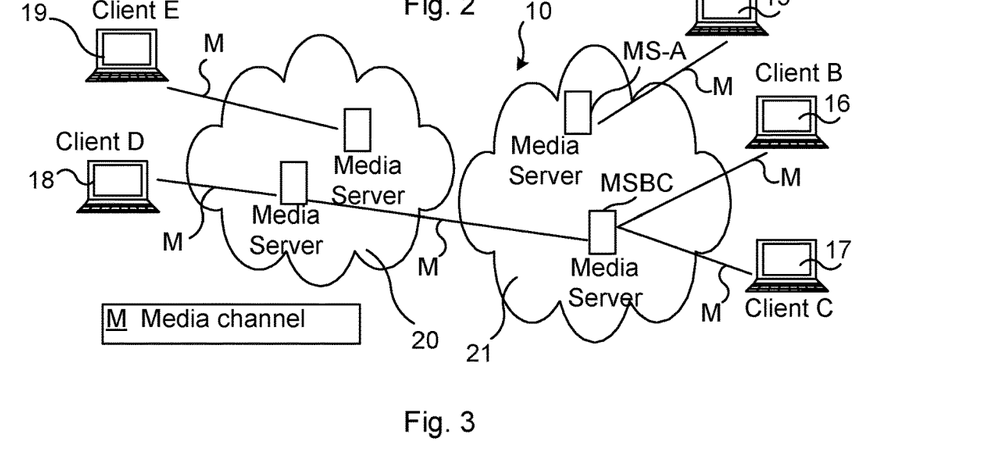
FIG. 3 illustrates a point-to-point topology in accordance with an aspect of the present disclosure.

A third embodiment for discovering media servers comprise a point-to-point cloud configuration. In particular, this is a simple configuration where every user has a permanent link to one so-called First-Hop MRFP (FH-MRFP) that the user has discovered for instance using the Domain Name System (DNS), dynamic DNS, or any other mechanism, such as through using a local broadcast in its local subnet. FIG. 3 illustrates such cloud topology. For example, client A (also denoted by reference numeral 15) has as its FH-MRFP, the MRFP denoted MS-A in FIG. 3, client B (also denoted by reference numeral 16) and client C (also denoted by reference numeral 17) both have as their FH-MRFP, the MRFP denoted MS-BC in the figure. Client D (also denoted by reference numeral 18) and client E (also denoted by reference numeral 19) have correspondingly their FH-MRFPs. In the FIG. 3, the lines, indicated by letter M, from clients to MRFPs indicate media channels. All the media traffic originating from and destined to the user will go through this FH-MRFP. The end-to-end media paths between the users and the MRFPs (that is, the interconnections between users. FH-MRFPs, and other MRFPs in the cloud) can be defined either by the different MRFPs or by the users. In the latter alternative, the user can inform its FH-MRFP about the interconnections needed for her service.

In addition, the FH-MRFP can inform the user about the existence of other MRFPs, that is, it can inform about the interconnections that are possible to establish in the cloud network 20, 21.

In this model, every user will be linked to one FH-MRFP. In contrast, a single FH-MRFP can be linked to many users at the same time. This is illustrated in the FIG. 3 in that clients B and C are connected to the same FH-MRFP. However, for the sake of redundancy or load balancing, a user may also connect to multiple FH-MRFPs in parallel—if the primary FH-MRFP becomes overloaded or crashes, the user can direct her traffic to one of the secondary FH-MRFPs.

A fourth set of embodiments for discovering media servers comprise any combination of the above described three embodiments. For instance, every user may be linked to one FH-MRFP (First-Hop MRFP) and this MRFP can learn about the topology of the cloud network 20, 21 by obtaining the information from a Database Media Server (DMS).

As another, every user may be linked to one FH-MRFP (First-Hop MRFP) and this FH-MRFP can learn about the topology of the cloud network 20, 21 by obtaining the information from a Multicast Channel.

Once the locations and capabilities of the MRFPs in the cloud network 20, 21 are known to the user through the use of one of the mechanisms for discovering the MRFPs, as has been described, the cloud network 20, 21 should provide means to configure some (or possibly all) of the discovered MRFPs into a delivery hierarchy necessary to support a media session. That is, the MRFPs need to be inter-connected to each other.

The process of organizing the MRFP virtual machines into a media delivery hierarchy, that is, the process of interconnecting the MRFPs, may be implemented in different ways. Although some particular embodiments will be described next, the cloud communication system 10 may also use other type of methods to choose which MRFPs to interconnect into a media session. Thus, any of the following interconnection mechanisms may be used:

User-driven interconnection process: the creator of a service, e.g. a conference or media session, which for instance may be the user who started the service, or the administrator of the service, can assign the specific MRFPs to be used in the service.

User voting based interconnection process: every user in the service, e.g. conference or media session, can vote for her candidate MRFPs and, democratically, the MRFPs with the most votes will be selected for the service.

3rd-party driven interconnection process: a third party component may automatically, for instance, based on the capabilities and locations of the MRFPs, assign the MRFPs to be used in a particular service, e.g. media session. In some special scenarios, the third-party can be a user not participating in the service, e.g. not participating in a conference.

Self-organizing interconnection process: the cloud communication system can be completely self-organizing. That is, the first user in the service, e.g. media session, uses one of the mechanisms described earlier (i.e. DIMS, multicast, point-to-point discovery, or combinations thereof) to find an initial MRFP to which he connects. After this, the initial MRFP applies one of the mechanisms recursively to find the next MRFP (or destination user in case of for instance a two-party call) to which to connect. This process continues whenever anew user joins the media session.

Next, different use cases will be described for a user who wants to create a multimedia session, e.g. a conference service, with another user.

In the use case described in various examples below, user A and user B create a conference service between them using a (Distributed) Database Media Server.

In a first example of this use case, a user-driven interconnection process using DMS-based discovery is described with reference to FIG. 4. In this use case, it is assumed that user A will be the administrator of the conference. The user-driven interconnection process begins when users A and B decide to establish the conference.

As an administrator, user A will first have to contact the Database Media Server (DMS) 13 (in datacenter denoted 002) to obtain the available MRFPs $14_1$, $14_2$, $14_3$, $14_4$ in the cloud network 20, 21. The user A may obtain the address of the DMS through a variety of different means, e.g. through DNS, a trusted website, local broadcast in its subnet (when appropriate), or configuration. In the case of a distributed DIMS 12, 13, the user A may learn the address of an existing peer (i.e. existing DMS) in the DMS overlay from a RELOAD enrollment server. A database interface is illustrated in the figure as lines denoted by letter "D" from the client A (of user A), to the DMS 13 (in datacenter DC2) to the DMS 12 (in datacenter DC1).

The user A may access the DMS 13 using some existing protocol for accessing distributed information services over IP networks. LDAP and XML enabled directory (XED) are examples of such protocols but the present disclosure is not limited to these protocols, others could alternatively be used. In the case of a distributed DMS 12, 13, the RELOAD protocol may be used.

The user A may filter his queries to obtain the most appropriate MRFPs $14_2$, $14_4$. For instance, he may filter the queries to obtain the MRFPs having the lowest load in the cloud network.

Once the user A has obtained the available MRFPs, he, as the conference administrator, may choose the MRFPs which are to be used for the media plane and may contact those MRFPs in order to create the interconnections between them. As user A has the IP addresses of the different MRFPs, each MRFP may be contacted directly; the user contacting the MRFP by sending a signaling protocol (e.g. session initiation protocol, SIP, Hypertext Transfer Protocol, HTTP, Extensible Messaging and Presence Protocol, XMPP etc.) message to it. In the case illustrated in FIG. 4, the user A chooses MRFPs $14_2$, $14_4$ and a media channel is set up between user A (having client A) and user B (having client B), the media channel indicated by lines denoted by letter "M".

If further users (e.g. a user C, not illustrated) join the conference by contacting user A, user A will either connect user C to one of the existing media servers, or create interconnections between new MRFPs, if necessary.

In a second example of this use case, a user voting based interconnection process using DMS-based discovery is described. This use case is similar to the above use case. User A will discover the available MRFPs in the same fashion, using the DMS. However, user A will inform user B about the available MRFPs and both users A, B will decide democratically which MRFPs to use in the conference service. The voting procedure may take place for instance in a web-based tool or by using the Graphical User Interface (GUI) of the users' communication applications (provided in the users' client).

In a third example of this use case, a 3rd-party driven interconnection process using DMS-based discovery is described. In this use case, a third party component (e.g. an enterprise server) will automatically assign the MRFPs used in a particular media session. Either user A, the administrator of the media session (e.g. conference), or the third party component will contact the DMS. Once the third party component has obtained the information of the MRFPs in the cloud network, it will arrange the necessary hierarchy to support the media session.

The third party component may not be physically apart of the cloud provider's cloud network. In contrast, in most cases the third party component will belong to user A's network, or, in case of an enterprise, the third party component will reside in the enterprise network.

In a fourth example of this use case, a self-organizing interconnection process using DMS-based discovery is described. In this use case, user A will contact the DMS in order to obtain the initial MRFP candidate for the conference service. User A will contact the DMS in a similar fashion as in the user-driven interconnection process described earlier. However, in this case, the user A will choose only one MRFP.

Once the initial MRFP has been chosen, user A will send the information to this initial MRFP about the rest of the users wanting to participate in the conference. The initial MRFP will then discover and interconnect all of the other MRFPs of the conference through the DMS and inform these MRFPs about the users who need to be connected to the conference. In particular, the initial MRFP may ask the DMS for information relating to the other MRFPs and then interconnect the MRFPs thus creating a communication path. This process continues until all the users of the conference have been joined to the conference.

In the particular use case described, initially comprising only two users (user A and user B), the initial MRFP will directly contact user B and will create the media links between both users (i.e. between their respective client).

In another scenario, it is assumed that there are three users, A, B, and C that want to establish a conference session.

Step 1: User A is aware of all the users (i e aware of itself, B, and C) that are to be joined into the conference session.

Step 2: User A contacts the DMS in order to discover a MRFP, for example located close to itself.

Step 3: The DMS returns the address of the most suitable MRFP to serve user A. Alternatively, the DMS may return multiple alternative MRFPs, in which case user A needs to select one of them. The returned or selected MRFP of user A is henceforth referred to as MS-A.

Step 4: User A contacts MS-A and sends, to MS-A, the contact information of all the users that are to be connected to the conference.

Step 5: MS-A figures out certain relevant information about the users, such as the geographical locations of the users, the codecs they use, and so forth. In some cases, this information was provided to it by user A. In other cases, MS-A may for instance directly contact the users A, B, C to obtain the information, or it may contact a database maintaining this information.

Step 6: Having obtained the required information about the users (A. B, and C), MS-A determines the best configuration of MRFPs to serve all of these users A, B, C. As an example, if all of the users A, B, C are using different video codecs, MS-A may invite additional MRFPs to the conference session so that transcoding between all the video codecs can be performed. In this case, MS-A attempts to discover two additional MRFPs, MS-B, and MS-C located close to users B and C, respectively, and establishes interconnections between the three MRFPs. Optionally, MS-A may also add a fourth MRFP, MS-D that is not connected to any user, but only to the other MRFPs. Such a MRFP (MS-D) may perform operations such as audio and video mixing in the conference. Finally, MS-A establishes the links between user A and itself, user B and MS-B, and user C and MS-C. The appropriate number of MRFPs and the topology between them depends on various factors such as number of users in the conference, the locations of the users, the amount of processing required by the media streams, the codecs used by the users, and so forth.

Next, a second use case will be described. In the examples of this second use case described below, user A and B create a conference session between them using multicast-based MRFP discovery. The MRFPs exchange information about their locations through a multicast group. The users A and B subscribe to this group in order to obtain information about MRFPs.

In a first example of this use case a user-driven interconnection process based on multicast discovery is described. User A is assumed to be an administrator of the conference session. As the administrator, user A will first subscribe himself to the multicast channel to discover the available media servers in the cloud communication system 10.

It is assumed that the user A has pre-loaded the multicast address in his communication device. As an alternative, the user A may obtain that information for instance from a trusted website (e.g. from an enterprise intranet page).

Further, it is assumed that there are multiple multicast channels to which the user A can subscribe. The multicast channels may be divided based on some specific characteristics of the media servers. For example, a particular multi cast channel may be used for finding a media server having characteristics making it suitable for use in conference sessions. The multicast channels may thus be divided in the characteristics of the media servers, for instance, there may be a multicast channel for the media servers which support only video, another multicast channel for the media servers which support video and audio, another multicast channel for the media servers which support an specific codec etc. Then, users may subscribe to the channel which is most suitable for their specific service.

Once the user A has obtained the available media servers, he will unsubscribe from the multicast channel and he—as the conference administrator—will choose the media servers to be used for the media session, and will contact, using IP protocols (e.g. SIP, HTTP, XMPP etc.), those media servers to create the interconnections between them. The sending of such protocol messages may be triggered by the user by means of a user interface.

In a second example of this second use case a user voting based interconnection process based on multicast discovery is described. This use case is similar to the previous case described above; user A discovers the available media servers in the same fashion. However, user A will inform user B about the available media servers and both users will decide democratically which media servers to use in the conference service.

In a third example of this second use case a third-party driven interconnection process based on multicast discovery is described. In this third example of the second use case, a third party component (e.g. an enterprise component, such as an enterprise server) will automatically assign the media servers used in a particular media session, e.g. a conference service. Either user A, who is the administrator of the conference service, or the third party component will subscribe to the appropriate multicast channel. Once the third party component has obtained information about media servers that are available in the cloud communication system 10, it will arrange the necessary delivery hierarchy between users A and B to support their media session.

Figures 4, 5:
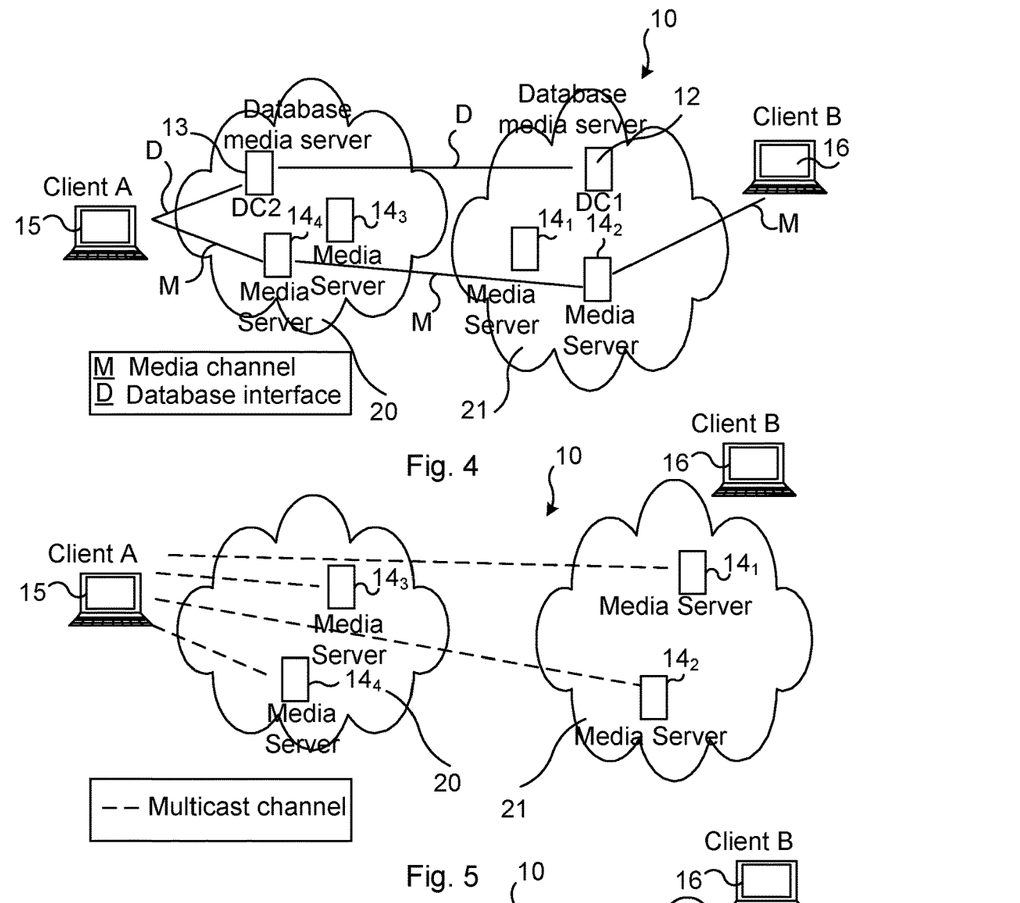
FIG. 4 illustrates a cloud infrastructure using database media servers in accordance with an aspect of the present disclosure.
FIG. 5 illustrates a cloud infrastructure using multicast in accordance with an aspect of the present disclosure.

In a fourth example of this use case, illustrated in FIG. 5, a self-organizing interconnection process based on multi cast discovery is described. In this example, user A (also denoted client A and indicated by reference numeral 15 in the figure) will subscribe to an appropriate multicast channel (indicated by dashed lines in the FIG. 5) to obtain an initial MRFP candidate for the conference service.

Once the first MRFP has been chosen for the conference service, user A will send the information about the rest of the users (only one such user indicated in FIG. 5: client B, also indicated by reference numeral 16) wishing to participate in the conference to this MRFP. This initial MRFP will then discover and interconnect the other media servers to be used in the conference through subscribing to the same multicast channel as user A. Further, the initial MRFP will inform the other MRFPs about the users who need to be connected to the conference service.

This process continues until all participants have joined the new conference service.

In the example, since initially comprising only two users (client A and client B in FIG. 5), the initial MRFP will not need to subscribe to any multicast channel. Instead, it will directly contact user B (reference numeral 16) and create the media links between users A and B.

Figure 6:
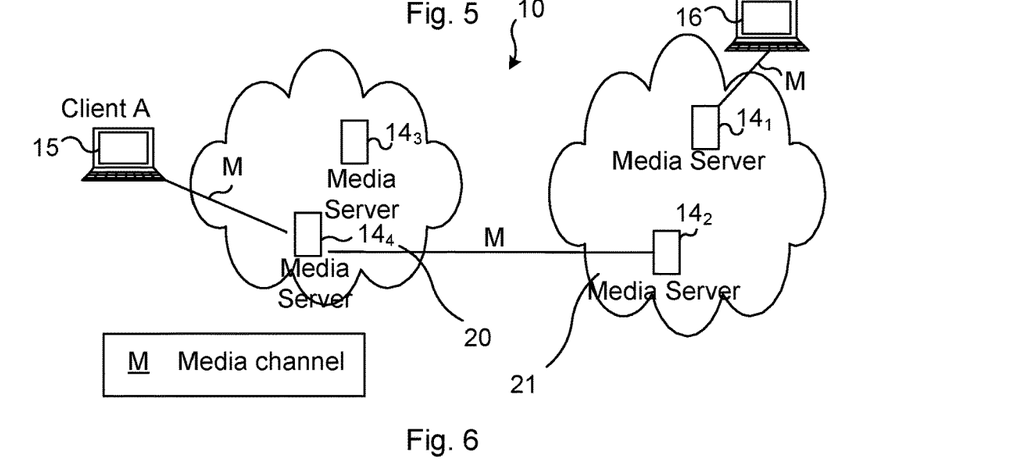
FIG. 6 illustrates a point-to-point cloud topology in accordance with an aspect of the present disclosure.

Next, a third use case will be described, wherein a conference service is created using point-to-point cloud configuration. In the examples of this third use case described below, user A is connected through a permanent link to her First-Hop MRFP (FH-MRFP) and user B to another FH-MRFP. FIG. 6 illustrates this use case, and in particular a point-to-point cloud topology.

In a first example of this third use case, a user-driven interconnection process based on point-to-point discovery is used. As described earlier, the starting point for the point-to-point discovery based user-driven MRFP interconnection process is that user A is connected through a permanent link to her FH-MRFP (MRFP denoted $14_4$ in FIG. 6) and user B to another FH-MRFP (MRFP denoted $14_1$ in FIG. 6). In this use case, it is assumed that user A is the administrator of the conference service.

The end-to-end media paths (media channel indicated in the FIG. 6 by letter "M") between the users and the MRFPs can be defined either by the different MRFPs or by the user A. In the latter alternative, the user A can inform her FH-MRFP (MRFP $14_4$) about the interconnections needed for her service. User A can discover the different MRFPs in the cloud network 20, 21 by using the methods described earlier, e.g. DMS and/or multicast. Once user A obtains the available MRFPs, she can order her FH-MRFP (MRFP $14_4$) to create the interconnections between them.

In a second example of this third use case, a user voting based interconnection process based on point-to-point discovery is used. This example is very similar to the previous example. User A will discover the available MRFPs in the same fashion. However, user A will inform user B about the available MRFPs and both users will decide democratically which MRFPs to use in the conference service. After that, user A and B will inform their corresponding FH-MRFPs about the interconnections between them.

In a third example of this use case, a 3rd-party driven interconnection process based on point-to-point discovery is used. In this example, a third party component will automatically assign the MRFPs used in a particular media session. The third party component will inform either user A, who is the administrator of a conference, or user A's FH-MRFP about the available MRFPs in the cloud network. Once the FH-MRFP has obtained the information about the MRFPs that are to be used, it will arrange the necessary delivery hierarchy to support the media session informing the other FH-MRFPs in the cloud network.

In a fourth example of this use case, a self-organizing interconnection process based on point-to-point discovery is used. In this example, user A will contact her permanently-connected FH-MRFP and will send the information of the rest of the users in the conference to her FH-MRFP. User A's FH-MRFP will then discover the other FH-MRFPs of the conference using any of the methods as described, e.g. DMS or multicasting.

In this exemplary case, since there were initially only two users, the initial MRFP will discover the FH-MRFP of user B or will try to directly contact user B to create the media links between the users A and B.

Several ways have been described on how the MRFPs are discovered and how the interconnections between them are organized. In the following the creation of MRFPs (i.e. media server virtual machines, also denoted media server instance) will be described. The creating of the MRFPs and keeping a suitable number thereof, i.e. scaling the number of MRFPs up and down, will be described.

It is the responsibility of the cloud service provider to create the initial set of MRFPs (media server virtual machines) in the datacenters that the cloud service provider is operating. One among many potential initial MRFP deployment strategies may be to simply create a single MRFP, or a cluster of MRFPs, in every datacenter that the cloud service provider is operating.

Since the initial set of deployed MRFPs may run out of capacity as a result of a high number of ongoing multi media sessions, a mechanism is provided to create new MRFPs whenever deemed necessary. The mechanism described is self-replication. In self-replication, a MRFP that is about to reach its maximum capacity, e.g. in terms of CPU (Central Processing Unit) load, memory, storage space, or network bandwidth, will autonomously trigger the creation of anew MRFP. To achieve this, the MRFP asks the cloud operating system (e.g. an OpenStack system), which is part of the cloud communication system 10, to spawn anew MRFP image, virtual machine image, in the same datacenter in which it is located. Before asking the cloud operating system to spawn a new image, the MRFP may check whether there are other MRFP with idle capacity present in the same datacenter. Such check may be done using the MRFP discovery mechanisms described earlier (e.g. DMS or multicast). If existing MRFPs with idle capacity are discovered in the same datacenter, the idle capacity in them is preferably used before creating new MRFPs.

A MRFP may also autonomously decide to scale down, that is, remove itself from the cloud network 20, 21. Such scaling down action can be triggered for instance if the MRFP has been idle for some pre-configured amount of time. The operator of cloud network 20, 21 may specify certain constraints to scaling down. As an example, the operator may specify that only MRFPs that have been created as a result of an autonomous scaling up decision can be scaled down and that MRFPs that were created during the initial deployment phase may never be scaled down. If such initially created MRFPs were allowed to scale down, it might happen that after some period of idleness globally in the cloud network 20, 21, all of the MRFPs would be removed as a result of autonomous scaling down decisions.

Finally, new MRFPs may also autonomously be created in datacenters that did not previously have any MRFPs. This is possible if information about datacenters and their locations is maintained in a database such as the DMS. As an example, a media server that has experienced a high number of users connecting to it from relatively distant locations (the users connect to this MRFP since they consider it to be the geographically closest MRFP for them), the media server may check whether there exists a datacenter located closer to the users than the datacenter in which the MRFP itself is running. If such a datacenter is discovered, the MRFP may ask (e.g. a particular function/node in) the distributed cloud communication system 10 to create a new MRFP (or MRFP cluster) in the datacenter. This newly created MRFP can then be used to serve new users in the future.

Whenever anew MRFP is created, it needs to register with the DMS or join the multicast group and let the other MRFPs know about its existence. Further, whenever existing MRFPs are removed, they need to de-register from the DMS or inform the multicast group that they will cease to exist.

Irrespective of which media server discovery mechanism (DMS, multicast, or point-to-point) is used, it may be beneficial to implement a selection of which media server to use from the set of discovered media servers in a probabilistic fashion. In other words, if media server selection is based for instance on load of the media server, the user should pick one media server among a number of least loaded media servers at random. Such probability-based media server allocation may be implemented in order to prevent situations wherein multiple users executing the media server discovery process at the same ti me end up choosing the same (least loaded) media server and thus overload that particular media server.

The examples described above have assumed that a media session is always established between only two users and that the intention of these users to join the media session is known already when the session is being created. A slightly more complicated case is when additional users wish to join an ongoing media session. The first action such users need to take is discovering the ongoing media session, e.g. a conference. Different means to discover the ongoing media session can be envisioned.

A first way of discovering the ongoing conference is to use a DMS implemented either as a server-based database or a DHT overlay among the media servers, or use a component similar to the DMS for storing information about all ongoing media sessions. In addition, for each ongoing media session, the DMS (or similar component) stores information about at least one media server carrying out media processing for that media session. In order to query the DIMS, the user needs to know the identifier of the media session which he wants to join.

Further users joining the media session always contact the user acting as the administrator of the media session. The administrator then interconnects the new users to the media servers. Alternatively, the user may delegate the task of interconnecting the users and the media servers to the joining user, to the FH-MRFP of the joining user, or to a third-party component.

Figure 7:
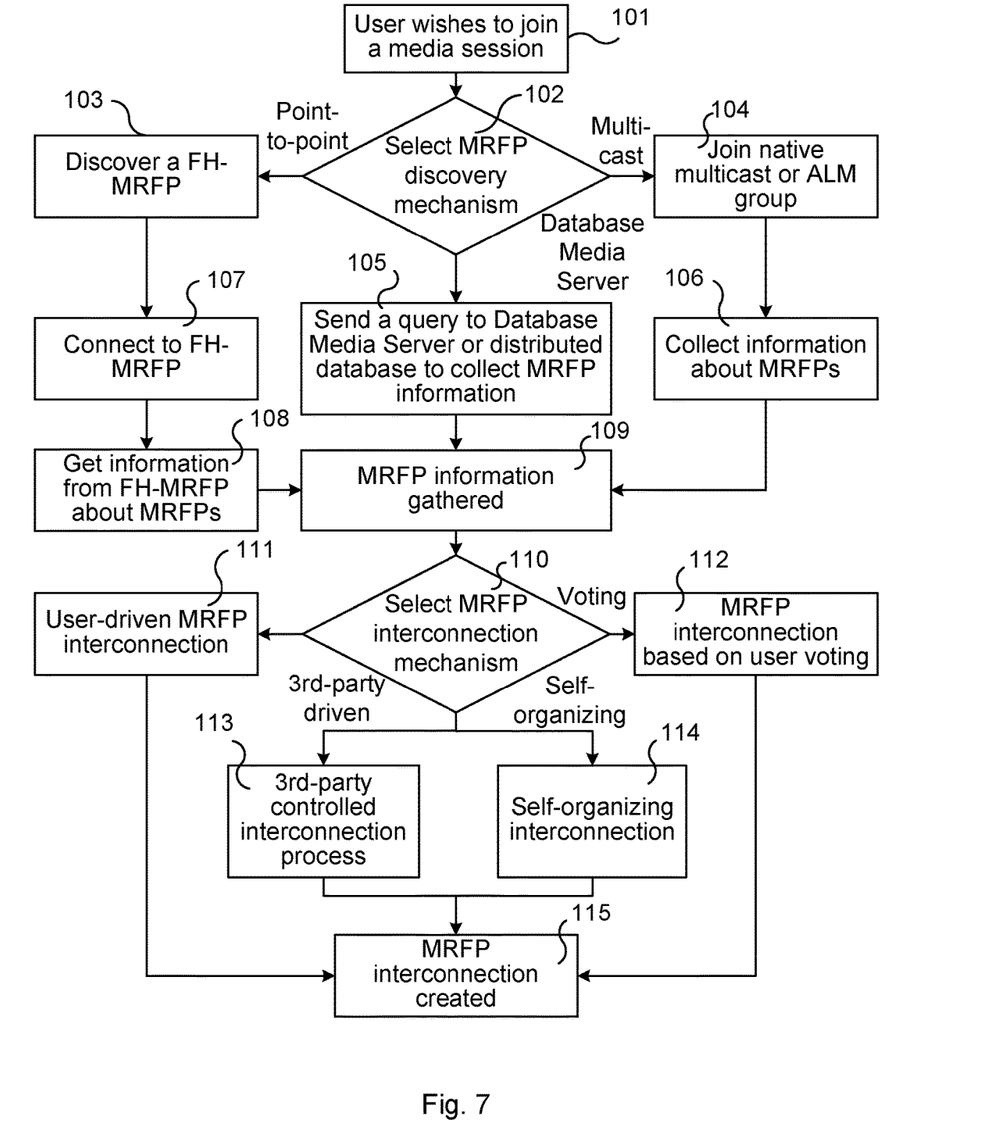
FIG. 7 is a flow chart illustrating operations performed in a node in accordance with the present disclosure.

The described ways of discovering the MRFPs and interconnecting selected ones is described further in the following, with reference to FIG. 7. FIG. 7 is a flow chart illustrating steps of a procedure 100 that may be performed in accordance with the present disclosure. The procedure 100 may be implemented in a single node or functions performed by the procedure may be distributed to several nodes.

Box 101. A user wishes to join or establish a media session.

Box 102. In order to join or establish a media session, the user needs to discover one or more media servers. The user can discover media servers using one of three discovery mechanisms: point-to-point discovery (flow continues to box 103), multi-cast discovery (flow continues to box 104) or using DMS for the discovery (flow continues to box 105).

Box 103. If point-to-point discovery is used, the user discovers an FH-MRFP and the flow then continues to box 107.

Box 104. If multicast discovery is used, the user joins a native multicast group or an ALM distribution tree, and the flow then continues to box 106.

Box 105. If a DMS is used, the user queries the DMS (which may be distributed DMS organized using a DHT overlay) to gather information about media servers, and the flow then continues to box 109.

Box 106. In box 106 the user gathers information about media servers from the multicast group, the flow then continues to box 109.

Box 107. In box 107, the user connects to an FH-MRFP, and the flow then continues to box 108.

Box 108. In box 108 the user gets information about media servers available in the system from the FH-MRFP, and the flow then continues to box 109.

Box 109. In box 109, irrespective of which discovery mechanism was used, the user has finished gathering information about one or more media servers.

Box 110. Having discovered one or more media servers, the user selects one of the four media server interconnection mechanisms: user-driven media server interconnection process (box 111), voting-based interconnection process (box 112), third-party-driven interconnection process (box 113) or self-organizing interconnection process (box 114).

Box 111. In box 111, the user has chosen the user-driven media server interconnection process, and the flow then continues to box 115.

Box 112. In box 112, the user has selected the interconnection process based on user voting, and the flow then continues to box 115.

Box 113. In box 113, the user relies on the third-party-driven interconnection process, the flow then continues to box 115.

Box 114. In box 114, the user has chosen to rely on the self-organizing interconnection process. Flow then continues to box 115.

Box 115. Finally, in box 115, all the required media server interconnections have been created and the user is a part of a multi media session.

Figure 8:
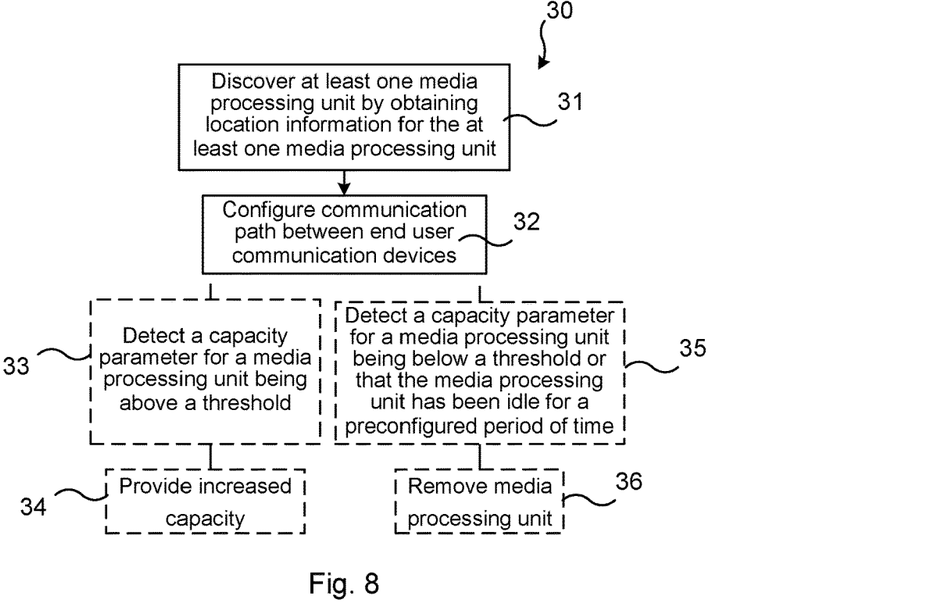
FIG. 8 illustrates a flow chart over steps of a method in anode in accordance with the present disclosure.

FIG. 8 illustrates a flow chart over steps of a method in anode in accordance with the present disclosure. The method 30 may be performed in a node 15, 16; $14_1$, $14_2$, $14_3$, $14_4$ for configuring a communication path for a media service. The communication path is configured in a cloud network 20, 21 comprising at least one media processing unit $14_1$, $14_2$, $14_3$, $14_4$ configured to handle media processing required by the media service. The node 15, 16; $14_1$, $14_2$, $14_3$, $14_4$ is located along the communication path. The node 15, 16; $14_1$, $14_2$, $14_3$, $14_4$ could be seen as part of the communication path in that it is involved in receiving, transmitting and/or processing data packets of the media service. This is in contrast to prior art, wherein a centralized controller node is configured to set up a requested media service and is thus a separate node. Such prior art centralized controller node handles e.g. control signaling to media processing units of one or several media sessions and is not located along any communication path. The node 15, 16; $14_1$, $14_2$, $14_3$, $14_4$ may be an end user communication device 15, 16 or a media processing unit $14_1$, $14_2$, $14_3$, $14_4$ processing media streams for the media service.

The method 30 comprises discovering 31 at least one media processing unit $14_1$, $14_2$, $14_3$, $14_4$ by obtaining location information for the at least one media processing unit $14_1$, $14_2$, $14_3$, $14_4$. This discovering 31 may be done in one of several ways, as has been described.

The method 30 comprises configuring 32 the communication path between end user communication devices 15, 16 of the media service by interconnecting one or more of the discovered media processing units $14_1$, $14_2$, $14_3$, $14_4$. The configuring of the communication path may also be done in various ways, as have been described.

In an embodiment, the discovering comprises retrieving the location information from a database component 12, 13 storing and updating location information for all media processing units $14_1$, $14_2$, $14_3$, $14_4$ in the cloud network 20, 21.

In an embodiment, the discovering comprises receiving the location information in a multicast channel.

In an embodiment, the node 15, 16 is configured with a first-hop media processing unit ($14_1$, $14_2$, $14_3$, $14_4$) and wherein the discovering comprises obtaining the location information from the first-hop media processing unit $14_1$, $14_2$, $14_3$, $14_4$.

In an embodiment, the configuring comprises the node 15, 16 receiving user input selection of media processing units $14_1$, $14_2$, $14_3$, $14_4$ and configuring the communication path between the selected media processing units $14_1$, $14_2$, $14_3$, $14_4$.

In an embodiment, the node 15, 16 comprises an end user communication device 15, 16 and wherein the configuring comprises a self-organizing interconnection process comprising the end user communication device 15, 16 connecting to an initial media processing unit $14_1$, $14_2$, $14_3$, $14_4$, which in turn connects to another end user communication device or discovers at least one media processing unit $14_1$, $14_2$, $14_3$, $14_4$ to which is connects, the process being repeated by each connected media processing unit $14_1$, $14_2$, $14_3$, $14_4$ until all end user communication devices of users of the media service are connected to the media service.

In an embodiment, the node 15, 16; $14_1$, $14_2$, $14_3$, $14_4$ comprises an end user communication device 15, 16 and wherein the configuring comprises receiving, in the end user communication device 15, 16, votes from all end user communication devices regarding choice of media processing unit $14_1$, $14_2$, $14_3$, $14_4$ and interconnecting media processing unit $14_1$, $14_2$, $14_3$, $14_4$ receiving most votes such that all end user communication devices are interconnected.

In an embodiment, the method 30 comprises:
  detecting 33 that a capacity parameter for a media processing unit $14_1$, $14_2$, $14_3$, $14_4$ is above a threshold, and
    providing 34 increased creased capacity by:
    creating anew media processing unit $14_1$, $14_2$, $14_3$, $14_4$, or
    determining that another media processing unit $14_1$, $14_2$, $14_3$, $14_4$ has idle capacity and using the idle capacity for media processing.

In an embodiment, the method 30 comprises:
  detecting 35 that a capacity parameter for a media processing unit $14_1$, $14_2$, $14_3$, $14_4$ is below a threshold or that the media processing unit $14_1$, $14_2$, $14_3$, $14_4$ has been idle for a preconfigured period of time, and
    removing 36 the media processing unit $14_1$, $14_2$, $14_3$, $14_4$.

In a variation of the above two embodiments, the method 30 comprises providing information about creation and/or removal of a new media processing unit $14_1$, $14_2$, $14_3$, $14_4$ to a database component 12, 13 storing and updating location information for all media processing units $14_1$, $14_2$, $14_3$, $14_4$ in the cloud network 20, 21.

Figure 9:
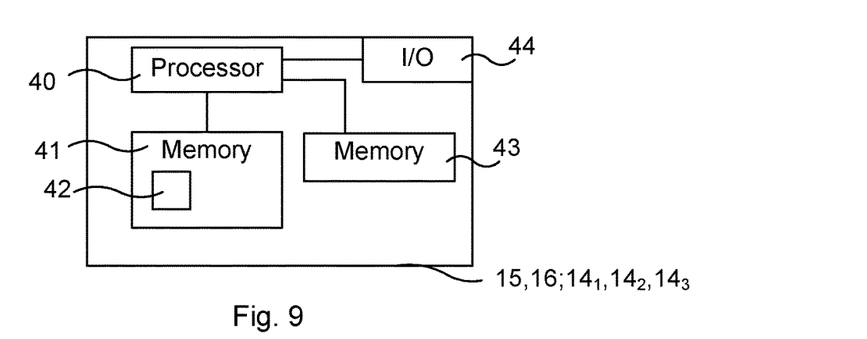
FIG. 9 illustrates schematically a node and means for implementing methods of the present disclosure.

FIG. 9 illustrates schematically anode 15, 16; $14_1$, $14_2$, $14_3$, $14_4$ and means for implementing various embodiments of the method of the present disclosure. The node comprises a processor 40 comprising any combination of one or more of a central processing unit (CPU), multiprocessor, microcontroller, digital signal processor (DSP), application specific integrated circuit etc. capable of executing software instructions stored in a memory 41, which can thus be a computer program product 41. The processor 40 can be configured to execute any of the various embodiments of the method as described earlier, e.g. in relation to FIGS. 7 and 8.

The memory 41 can be any combination of read and write memory (RAM) and read only memory (ROM). The memory 41 also comprises persistent storage, which, for example, can be any single one or combination of magnetic memory, optical memory, solid state memory or even remotely mounted memory. The memory 41 may comprise a computer program 42 for implementing embodiments of the method as has been described. Such computer program 42 may comprise one or several computer modules performing various functions.

A data memory 43 may also be provided for reading and/or storing data during execution of software instructions in the processor 40. The data memory 43 can be any combination of read and write memory (RAM) and read only memory (ROM).

The node 15, 16; $14_1$, $14_2$, $14_3$, $14_4$ may also comprise an input/output device 44 for receiving and transmitting data packets.

When the node 15, 16; $14_1$, $14_2$, $14_3$, $14_4$ is a communication device handled by an end user, the node may comprise further components (not illustrated) such as user interface, display, antenna arrangements etc.

It is realized that when the node 15, 16; $14_1$, $14_2$, $14_3$, $14_4$ is a media processing unit, in particular a media server instance running in one virtual machine within a data center, devices such as input/output devices are software implementations. That is, every virtual machine has a virtual network interface for input/output. However, the physical server on which the virtual machines are running obviously needs to have physical input/output device (physical network interface). The virtual machines are sharing the physical network interface, in known manner.

A node 15, 16; $14_1$, $14_2$, $14_3$, $14_4$ is thus provided for configuring a communication path for a media service is provided. The communication path is configured in a cloud network 20, 21 comprising at least one media processing unit $14_1$, $14_2$, $14_3$, $14_4$ configured to handle media processing required by the media service. The node 15, 16; $14_1$, $14_2$, $14_3$, $14_4$ is located along the communication path the node 15, 16; $14_1$, $14_2$, $14_3$, $14_4$ comprising a processor 40 and memory 41, the memory 41 containing instructions executable by the processor 40, whereby the node 15, 16; $14_1$, $14_2$, $14_3$, $14_4$ is operative to:

discover at least one media processing unit $14_1$, $14_2$, $14_3$, $14_4$ by obtaining location information for the at least one media processing unit $14_1$, $14_2$, $14_3$, $14_4$, and configure the communication path between end user communication devices 15, 16 of the media service by interconnecting one or more of the discovered media processing units $14_1$, $14_2$, $14_3$, $14_4$.

In an embodiment, the node 15, 16; $14_1$, $14_2$, $14_3$, $14_4$ is configured to discover by retrieving the location information from a database component 12, 13 storing and updating location information for all media processing units $14_1$, $14_2$, $14_3$, $14_4$ in the cloud network 20, 21.

In an embodiment, the node 15, 16; $14_1$, $14_2$, $14_3$, $14_4$ is configured to discover by receiving the location information in a multicast channel.

In an embodiment, the node 15, 16 is configured with a first-hop media processing unit $14_1$, $14_2$, $14_3$, $14_4$ and configured to discover by obtaining the location information from the first-hop media processing unit $14_1$, $14_2$, $14_3$, $14_4$.

In an embodiment, the node 15, 16 is configured to perform the configuring by receiving user input selection of media processing units $14_1$, $14_2$, $14_3$, $14_4$ and configure the communication path between the selected media processing units $14_1$, $14_2$, $14_3$, $14_4$.

In an embodiment, the node 15, 16 comprises an end user communication device 15, 16 configured to perform the configuring by a self-organizing interconnection process comprising the end user communication device 15, 16 connecting to an initial media processing unit $14_1$, $14_2$, $14_3$, $14_4$, which in turn connects to another end user communication device or discovers at least one media processing unit $14_1$, $14_2$, $14_3$, $14_4$ to which is connects, the process being repeated by each connected media processing unit $14_1$, $14_2$, $14_3$, $14_4$ until all end user communication devices of users of the media service are connected to the media service.

In an embodiment, the node 15, 16; $14_1$, $14_2$, $14_3$, $14_4$ comprises an end user communication device 15, 16 configured to perform the configuring by receiving, in the end user communication device 15, 16, votes from all end user communication devices regarding choice of media processing unit $14_1$, $14_2$, $14_3$, $14_4$ and interconnecting media processing unit $14_1$, $14_2$, $14_3$, $14_4$ receiving most votes such that all end user communication devices are interconnected.

In an embodiment the node 15, 16; $14_1$, $14_2$, $14_3$, $14_4$ is configured to:

detect that a capacity parameter for a media processing unit $14_1$, $14_2$, $14_3$, $14_4$ is above a threshold, and provide increased capacity by:
creating anew media processing unit $14_1$, $14_2$, $14_3$, $14_4$, or
determining that another media processing unit $14_1$, $14_2$, $14_3$, $14_4$ has idle capacity and using the idle capacity for media processing.

In an embodiment the node 15, 16; $14_1$, $14_2$, $14_3$, $14_4$ is configured to:

detect that a capacity parameter for a media processing unit $14_1$, $14_2$, $14_3$, $14_4$ is below a threshold or that the media processing unit $14_1$, $14_2$, $14_3$, $14_4$ has been idle for a preconfigured period of time, and remove the media processing unit $14_1$, $14_2$, $14_3$, $14_4$.

I variations of the above two embodiments, the node 15, 16; $14_1$, $14_2$, $14_3$, $14_4$ is configured to provide information about creation and/or removal of a new media processing unit $14_1$, $14_2$, $14_3$, $14_4$ to a database component 12, 13 storing and updating location information for all media processing units $14_1$, $14_2$, $14_3$, $14_4$ in the cloud network 20, 21.

The present disclosure also encompasses a computer program product 41 comprising a computer program 42 for implementing the methods as described above, and a computer readable means on which the computer program 42 is stored. The computer program product 41 may be any combination of read and write memory (RAM) or read only memory (ROM). The computer program product 41 may also comprise persistent storage, which for example can be any single one or combination of magnetic memory, optical memory or solid state memory.

The present disclosure thus comprises a computer program 42 for a node 15, 16; $14_1$, $14_2$, $14_3$, $14_4$ for configuring a communication path for a media service, the communication path being configured in a cloud network 20, 21 comprising at least one media processing unit $14_1$, $14_2$, $14_3$, $14_4$ configured to handle media processing required by the media service. The node 15, 16; $14_1$, $14_2$, $14_3$, $14_4$ is located along the communication path. The computer program 42 comprises computer program code, which, when run on the node 15, 16; $14_1$, $14_2$, $14_3$, $14_4$ causes the node 15, 16; $14_1$, $14_2$, $14_3$, $14_4$ to:

discover at least one media processing unit $14_1$, $14_2$, $14_3$, $14_4$ by obtaining location information for the at least one media processing unit $14_1$, $14_2$, $14_3$, $14_4$, and configure the communication path between end user communication devices 15, 16 of the media service by interconnecting one or more of the discovered media processing units $14_1$, $14_2$, $14_3$, $14_4$.

A computer program product 41 comprising a computer program 42 as above, and a computer readable means on which the computer program 42 is stored is also provided. The computer program product, or the memory, thus comprises instructions executable by the processor 40. Such instructions may be comprised in a computer program 42, or in one or more software modules or function modules.

Figure 10:
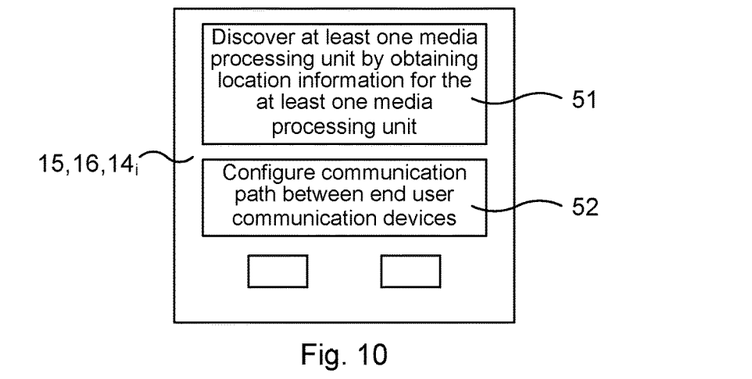
FIG. 10 illustrates a node comprising function modules/software modules for implementing methods of the present disclosure.

An example of an implementation using function modules/software modules is illustrated in FIG. 10, in particular illustrating anode 15, 16; $14_1$, $14_2$, $14_3$, $14_4$ comprising means, in particular function modules, for implementing embodiments of the method of the present disclosure. The node comprises means, in particular a first function module 51, for discovering at least one media processing unit $14_1$, $14_2$, $14_3$, $14_4$ by obtaining location information for the at least one media processing unit $14_1$, $14_2$, $14_3$, $14_4$. The node comprises means, in particular a second function module 52, for configuring the communication path between end user communication devices 15, 16 of the media service by interconnecting one or more of the discovered media processing units $14_1$, $14_2$, $14_3$, $14_4$. The node may comprise yet additional means, in particular additional function modules, as indicated by the empty boxes of FIG. 10, for performing other steps of the method as described.

The function modules 51, 52 can be implemented using software instructions such as computer program executing in a processor and/or using hardware, such as application specific integrated circuits, field programmable gate arrays, discrete logical components etc.

Modifications of the disclosed embodiments and other embodiments will come to mind to one skilled in the art having the benefit of the teachings presented in the foregoing descriptions and the associated drawings. Therefore, it is to be understood that the disclosure(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method performed in a node for configuring a communication path for a media service, the communication path being configured in a cloud network comprising at least one media processing unit configured to handle media processing required by the media service, the node being located along the communication path, the method comprising:

discovering, without aid of control plane modules, at least one media processing unit by obtaining location information for the at least one media processing unit, and configuring the communication path between end user communication devices of the media service by interconnecting one or more of the discovered media processing units;

wherein the node comprises an end user communication device and wherein the configuring comprises receiving, in the end user communication device, votes from all end user communication devices regarding choice of media processing unit and interconnecting media processing unit receiving most votes such that all end user communication devices are interconnected.

2. The method as claimed in claim 1, wherein the discovering comprises retrieving the location information from a database component storing and updating location information for all media processing units in the cloud network.

3. The method as claimed in claim 1, wherein the discovering comprises receiving the location information in a multicast channel.

4. The method as claimed in claim 1, wherein the node is configured with a first-hop media processing unit and wherein the discovering comprises obtaining the location information from the first-hop media processing unit.

5. The method as claimed in claim 1, wherein the configuring comprises the node receiving user input selection of media processing units and configuring the communication path between the selected media processing units.

6. The method as claimed in claim 1, wherein the node comprises an end user communication device and wherein the configuring comprises a self-organizing interconnection process comprising the end user communication device connecting to an initial media processing unit, which in turn connects to another end user communication device or discovers at least one media processing unit to which is connects, the process being repeated by each connected media processing unit until all end user communication devices of users of the media service are connected to the media service.

7. A method performed in a node for configuring a communication path for a media service for a plurality of end user communication devices, the communication path being configured in a cloud network comprising at least one media processing unit configured to handle media processing required by the media service, the node being located along the communication path, the method comprising:

discovering at least one media processing unit by obtaining location information for the at least one media processing unit;

detecting that a capacity parameter for a media processing unit of the at least one media processing unit is above a threshold, and providing increased capacity by:
creating a new media processing unit, or
determining that another media processing unit has idle capacity and using the idle capacity for media processing; and configuring the communication path between the plurality of end user communication devices in the communication path for the media service by interconnecting one or more of the discovered at least one media processing unit and the plurality of end user communication devices, wherein all media traffic originating from and destined to each of the plurality of end user communication devices for the media service flows through the communication path.

8. The method as claimed in claim 1, comprising:
detecting that a capacity parameter for a media processing unit is below a threshold or that the media processing unit has been idle for a preconfigured period of time, and removing the media processing unit.

9. The method as claimed in claim 7, comprising providing information about creation and/or removal of a new media processing unit to a database component storing and updating location information for all media processing units in the cloud network.

10. A node for configuring a communication path for a media service, the communication path being configured in a cloud network comprising at least one media processing unit configured to handle media processing required by the media service, the node being located along the communication path, the node comprising a processor and memory, the memory containing instructions executable by the processor, whereby the node is operative configured to:
discover, without aid of control plane modules, at least one media processing unit by obtaining location information for the at least one media processing unit, and
configure the communication path between end user communication devices of the media service by interconnecting one or more of the discovered media processing units;
wherein the node comprises an end user communication device configured to perform the configuring by receiving, in the end user communication device, votes from all end user communication devices regarding choice of media processing unit and interconnecting media processing unit receiving most votes such that all end user communication devices are interconnected.

11. The node as claimed in claim 10, configured to discover by retrieving the location information from a database component storing and updating location information for all media processing units in the cloud network.

12. The node as claimed in claim 10, configured to discover by receiving the location information in a multicast channel.

13. The node as claimed in claim 10, wherein the node is configured with a first-hop media processing unit and configured to discover by obtaining the location information from the first-hop media processing unit.

14. The node as claimed in claim 10, wherein the node is configured to perform the configuring by receiving user input selection of media processing units and configure the communication path between the selected media processing units.

15. The node as claimed in claim 10, wherein the node comprises an end user communication device configured to perform the configuring by a self-organizing interconnection process comprising the end user communication device connecting to an initial media processing unit, which in turn connects to another end user communication device or discovers at least one media processing unit to which is connects, the process being repeated by each connected media processing unit until all end user communication devices of users of the media service are connected to the media service.

16. A node for configuring a communication path for a media service for a plurality of end user communication devices, the communication path being configured in a cloud network comprising at least one media processing unit configured to handle media processing required by the media service, the node being located along the communication path, the node comprising a processor and memory, the memory containing instructions executable by the processor, whereby the node is configured to:
discover at least one media processing unit by obtaining location information for the at least one media processing unit;
detect that a capacity parameter for a media processing unit of the at least one media processing unit is above a threshold, and
provide increased capacity by:
creating a new media processing unit, or
determining that another media processing unit has idle capacity and using the idle capacity for media processing; and
configure the communication path between the plurality of end user communication devices in the communication path for the media service by interconnecting one or more of the discovered at least one media processing unit and the plurality of end user communication devices, wherein all media traffic originating from and destined to each of the plurality of end user communication devices for the media service flows through the communication path.

17. The node as claimed in claim 10, configured to:
detect that a capacity parameter for a media processing unit is below a threshold or that the media processing unit has been idle for a preconfigured period of time, and
remove the media processing unit.

18. The node as claimed in claim 16, configured to provide information about creation and/or removal of a new media processing unit to a database component storing and updating location information for all media processing units in the cloud network.

19. A computer program product for a node for configuring a communication path for a media service, the communication path being configured in a cloud network comprising at least one media processing unit configured to handle media processing required by the media service, the node being located along the communication path, the computer program product comprising a non-transitory computer readable storage medium storing computer program code, which, when run on a processor of the node causes the node to:
discover, without aid of control plane modules, at least one media processing unit by obtaining location information for the at least one media processing unit, and
configure the communication path between end user communication devices of the media service by interconnecting one or more of the discovered media processing units;
wherein the node comprises an end user communication device configured to perform the configuring by receiving, in the end user communication device, votes from all end user communication devices regarding choice of media processing unit and interconnecting media processing unit receiving most votes such that all end user communication devices are interconnected.

* * * * *